Figure 2:
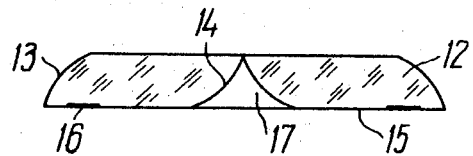

United States Patent
Shimulenis et al.

[15] 3,689,160
[45] Sept. 5, 1972

[54] ANGLE-READING DEVICE

[72] Inventors: Juozas Juozo Shimulenis, ulitsa Yan-Kupaly, 19/21, kv. 7; Petr-Vikenty Martynovich Shulsky, ulitsa Mintes, 30, kv. 45, both of Vilnjus, U.S.S.R.

[22] Filed: Jan. 22, 1970

[21] Appl. No.: 4,956

[52] U.S. Cl............356/152, 250/231 SE, 350/294
[51] Int. Cl..............................................G01b 11/26
[58] Field of Search........356/141, 152; 250/231 SE; 350/294

[56] References Cited

UNITED STATES PATENTS

| | | | |
|---|---|---|---|
| 2,457,253 | 12/1948 | Martin | 350/294 |
| 2,891,437 | 6/1959 | Tripp | 350/294 |
| 3,514,618 | 5/1970 | Seward | 250/231 SE |
| 3,500,449 | 3/1970 | Lenz | 250/231 |
| 3,238,375 | 3/1966 | Johnson | 250/231 SE |

*Primary Examiner*—Benjamin A. Borchelt
*Assistant Examiner*—S. C. Buczinski
*Attorney*—Waters, Roditi, Schwartz & Nissen

[57] ABSTRACT

An angle-reading device comprising a reflector, light source, circular scales, photo-multiplier tubes, and an electronic measuring unit with a meter, the reflector being a system of two mirrors one of which is circular and the other of which is conical and is placed inside the circular one. The light source is a toroidal strobe lamp to modulate the reference signal and the signal corresponding to the value of the angle of each scale step being read, which signals are applied to the electronic measuring unit comprising a differential circuit which compares the two signals.

8 Claims, 3 Drawing Figures

ANGLE-READING DEVICE

The present invention relates to instrumentation, and more particularly to angle-reading devices which may be used for the interpolation and checking of scales prepared by indexing, and especially for the interpolation and checking of graduation values.

Angle-measuring devices are known which contain an optical sensor fitted with a circular light source and circular scales mounted on a common axis. This optical sensor is connected to photo-multiplier tubes whose outputs are connected to the respective inputs of an electronic measuring unit (see, for example, U.S. Pat. No. 3,040,222). However, the device of said patent suffers from a number of major disadvantages. Among other things, the luminous flux is chopped and averaged by additionally rotating the circular scales, which entails a number of drawbacks such as complicated design, increased overall dimensions, vibrations, and a reduced dynamic range of measurements (especially at low rotational speeds) because it is necessary to filter out the carrier and parasitic frequencies of rotation. There is also the disadvantage that complicated circuitry is involved.

Additionally, scales of elaborate shape are far more difficult to make technically and are far more expensive economically than simple, plain scales with divisions applied, for example, to an end surface.

The base surfaces of scales must be prepared with the utmost of precision, since the mating of scales is technically complicated, while for a modification for example, of bevelled peripheral portions of the discs it is impossible to perform.

An object of the present invention is to provide a device that has a greater accuracy of angular measurements.

This object is accomplished with an angle-reading device in which an optical sensor containing a reflector, light source and circular scales mounted on a common axis is connected through a multiplier tube with an electronic-measuring unit having a meter and wherein the reflector is, according to the present invention, made up of a system of two mirrors one of which is circular, and the other of which is conical and placed inside the circular mirror, the axes of the said mirrors being coincident with the common axis, and the light source being a toroidal strobe lamp which modulates the reference signal and the signal corresponding to the present value of the angle of each scale step being read, the two signals being applied to the electronic measuring unit incorporating a differential circuit to compare these two signals.

The optical sensor may be fitted with diaphragms which may simultaneously be set up between the reflector and circular scales, between the circular scales and the toroidal strobe lamp, and between the photo-multiplier tube and the toroidal strobe lamp, so that the axes of these diaphragms are coincident with the common axis in the first two cases, and with the axis of the photo-multiplier tube in the last case. A diaphragm may alternatively be set up only in one of these positions.

It is preferable that the electronic measuring unit should contain a differential amplifier each input of which is connected through a rectifier and a series-connected cathode follower to a respective photo-multiplier tube, the output of the said differential amplifier being connected to the said meter. The electronic measuring unit may be fitted with a switch to select the range of angles to be measured.

It is preferable that the reflector should be a light conduit having the shape of a disc with a conical-spherical side surface, such that in the center of the disc there is a cut-out whose surface has either a conical or a spherical shape.

Figure 1:
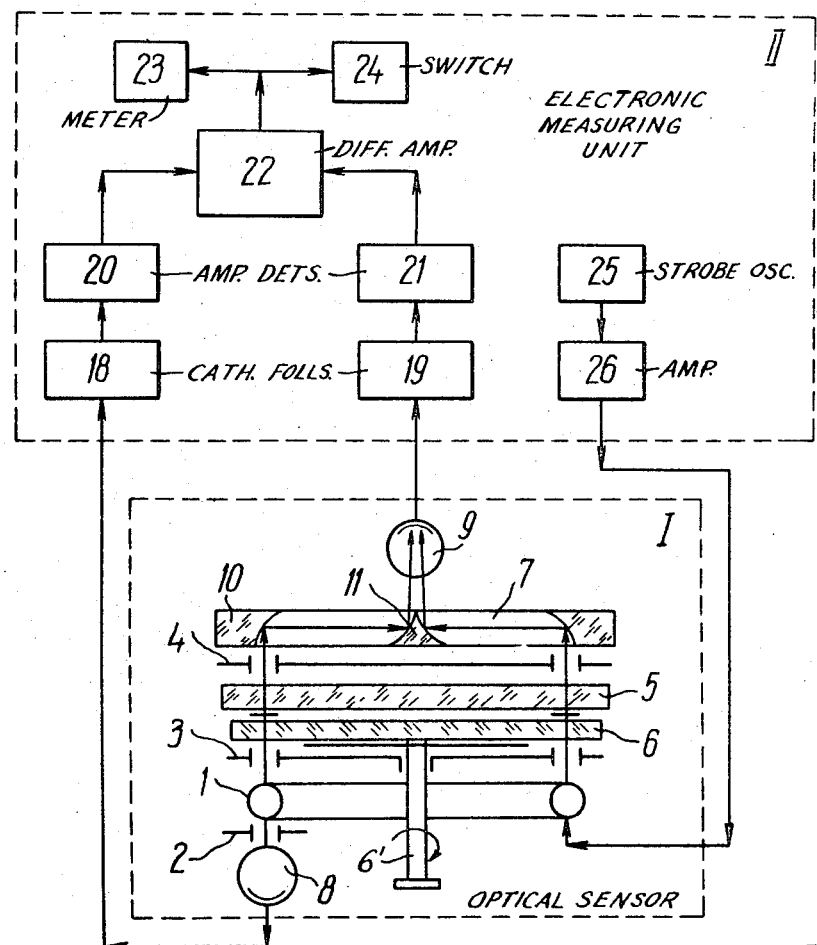

The invention will be best understood from the following description of a preferred embodiment, taken in connection with the accompanying drawings wherein:

FIG. 1 is a sketch of an angle-reading device, according to the invention;

FIG. 2. shows a light conduit of the device according to the invention; and

Figure 3:
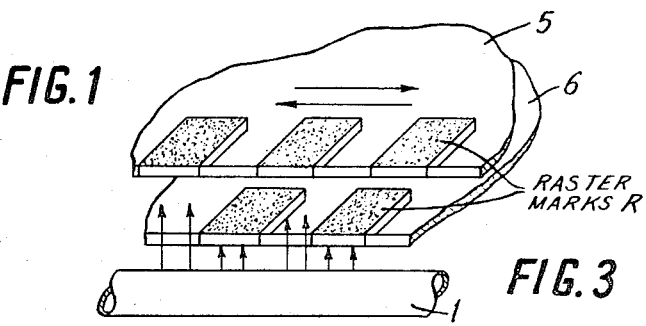

FIG. 3 shows a detail of the apparatus of FIG. 1.

In the drawings, appears an angle-reading device which contains an optical sensor I and an electronic measuring unit II. The optical sensor I has a light source which is a toroidal strobe lamp 1, diaphragms 2, 3, and 4, two circular scales 5 and 6, a reflector 7, and photo-multiplier tubes 8 and 9.

The toroidal strobe lamp, filled with, for example, argon and mercury, is connected to the electronic measuring unit II. The circular scales 5 and 6 include as shown in FIG. 3 opaque raster elements R (scribe marks) with a width equal to half the pitch of the raster elements. The diaphragm 2 may be made in the form of, for example, a plate with an opening and is placed between the toroidal strobe lamp 1 and the photo-multiplier tube 8. The diaphragms 3 and 4, each of which comprises two concentric annular discs, are placed between the toroidal strobe lamp 1 and the circular scale 5, and also between the scale 6 and the reflector 7, respectively. The axes of the diaphragms 3 and 4 should be coincident with the common axis.

All listed diaphragms 2, 3, and 4 may be located in the said positions simultaneously or, alternatively, only the diaphragms 3 and 4 or only the diaphragm 3 or 4 may be used.

The reflector may be a system of two mirrors 10 and 11 one of which, mirror 10, is circular, and the other of which, mirror 11, is conical and is placed inside the circular mirror 10 so that the axes of the mirrors 10 and 11 are coincident with the common axis of the optical sensor I. The reflector 7 may also be made as a light conduit 12 having the shape of a disc with a conical-spherical side surface 13, in the center of which there is a cut-out 17 whose surface 14 has a conical or a spherical shape. The reflecting surfaces 13 and 14 of the light conduit 12 and its bottom end 15, except for the land 16 corresponding to a projection of the diaphragm 4 on the end 15 of the light conduit 12, are given a coating of a reflecting material (for example, silver).

The photo-multiplier tube 8 is placed directly at the diaphragm 2, and the photo-multiplier tube 9 above the conical mirror 11 of the reflector 7. In the case of a light conduit 12, the photo-multiplier 9 is located above the cut-out 17.

The photo-multiplier tubes 8 and 9 are connected to the electronic measuring unit II. The electronic measuring unit II is essentially a differential comparison circuit and comprises cathode followers 18 and 19 whose inputs are connected to the photo-multipliers 8 and 9, and whose outputs are connected to the inputs of amplitude detectors 20 and 21. The amplitude detectors 20 and 21 are connected to the respective inputs of a differential amplifier 22 whose output is connected to a meter 23 (which, for example, may be a dial indicator), and an automatic switch 24 to select the range of angles to be measured. Connected in parallel with the meter 23 or instead of it, there may be an automatic recorder (omitted in the drawing).

The electronic measuring unit II also incorporates a strobe oscillator 25 to power the strobe lamp 1, which is connected to the lamp through a power amplifier 26.

The angle-reading device operates as follows.

A voltage pulse with a large ratio of the average pulse spacing to the average pulse duration is applied from the strobe oscillator 25 through the power amplifier 26 to the strobe lamp 1. The firing time of the strobe lamp 1 is equal to the duration of the supply voltage pulse.

A test object is connected with scale 6 by means of shaft 6' which can be rotated as shown by the arrow. Light from the strobe lamp 1 falls through the diaphragm 2 onto the photo-multiplier tube 8 on one side, and through the diaphragm 3 the transparent areas of the circular scales 6 and 5, the diaphragm 4 and from the reflector 7 onto the photo-multiplier tube 9 on the other.

The pulse voltage across the output of the photo-multiplier tube 8 is the reference signal. The amplitude of the pulse voltage across the output of the photo-multiplier tube 9 is a function of the intensity of light coming from the strobe lamp 1 and the relative positions of the circular scales 5 and 6. When the raster elements (marks) of the circular scales 5 and 6 coincide with one another, the luminous flux incident on the photo-multiplier 9 and, as a consequence, the amplitude of the output pulse voltage are maxima.

When, upon rotating, the raster elements of the circular scale 6 cover the light areas on the circular scale 5, the luminous flux incident on the photo-multiplier tube 9 and, as a consequence, the amplitude of its output pulse voltage will be minima.

In the middle position, the raster elements of the circular scale will cover only a half of the light areas on the circular scale 5. In this case, the luminous flux incident on the photo-multiplier tube 9 and, as a consequence, the amplitude of its output pulse voltage will have a medium value. The amplitude of the pulse voltage across the output of the photo-multiplier tube 8 is constant and equal to the medium value of that of the pulse voltage across the output of the photo-multiplier tube 9. The pulse voltage across the output of the photo-multiplier tube 9 corresponds to the existing value of the angle of each scale step being read.

Both voltages are fed via the cathode followers 18 and 19 to the amplitude detectors 20 and 21 where they are detected, filtered and applied to the inputs of the differential amplifier 22.

The differential amplifier 22 compares the amplitudes of the voltages representing the reference signal and the signal corresponding to the value of the angle of each scale step being read. The voltage appearing across the output of the differential amplifier 22 corresponds to the deviation of the present value of the angle being read from its average value over each reading step. In the present case, the reading step is equal to a half of the pitch between the raster elements (marks).

It should be noted that the voltage across the output of the differential amplifier 22 is independent of variations in the supply voltage or the firing of the strobe lamp.

When the circular scale 6 moves through small angles relative to the scale 5, readings are taken from the fine scale of the meter 23. When this angular displacement exceeds the nominal value of the fine scale, the automatic angle-range selector switch 24, which may, for example, be a current relay, shunts the input of the meter 23, and readings are taken from the coarse scale.

The angle-reading device disclosed herein may be used to accurately read the angle of every half-step of the scale of the optical sensor and also the deviation from the average value, using circular scales fabricated to a lower degree of accuracy. An experimental model of the device used circular scales with an indexing accuracy of 6 to 10 angular seconds. The performance of the experimental model was as follows: the most sensitive scale of the meter corresponded to the angular displacement of the circular scale through ±1 angular second; the resolution was 0.04 angular second; and the maximum cumulative error did not exceed 0.5 angular seconds.

The device disclosed herein measures 120 mm. in height and 112 mm. in diameter when the circular scale has 4,320 divisions, or 230 mm. when the scale has 21,600 divisions.

What is claimed is:

1. An angle-reading device comprising: an optical sensor including a toroidal strobe lamp, circular scales, and a reflector positioned in succession on a common axis; said scales being relatively displaceable about said axis and having respective markings the degree of overlap of which depends on the displacement of the scales; said reflector including a circular mirror and a conical mirror located inside said circular mirror so that the axes of said mirrors are coincident with the common axis; photomultiplier tubes one of which is located near said strobe lamp and generates a reference signal under the influence of said lamp, the other of said photo-multiplier tubes being located adjacent said reflector and generating a signal corresponding to the value of the relative angular displacement of the respective angular markings under the influence of said lamp; an electronic measuring unit including a differential circuit to compare said signals; and a meter connected to said differential circuit.

2. A device as claimed in claim 1, in which said optical sensor includes a diaphragm between said reflector and said circular scales, said diaphragm having an axis coincident with the common axis.

3. A device as claimed in claim 1, in which said optical sensor includes a diaphragm between said strobe lamp and said circular scales, said diaphragm having an axis coincident with the common axis.

4. A device as claimed in claim 1, in which said optical sensor includes a diaphragm between said one photo-multiplier tube and said strobe lamp, said diaphragm having an axis coincident with the axis of said one photo-multiplier tube.

5. A device as claimed in claim 1, in which said electronic measuring unit comprises: cathode followers including inputs connected to respective ones of said photo-multiplier tubes; amplitude detectors including inputs connected to respective outputs of said cathode followers; a differential amplifier including inputs connected to respective outputs connected to respective outputs of said amplitude detectors and an output connected to said meter.

6. A device as claimed in claim 5, in which said electronic measuring unit comprises an angle-range selector switch connected to the output of said differential amplifier.

7. A device as claimed in claim 1, in which said reflector is a light conduit.

8. A device as claimed in claim 7, in which said light conduit has the shape of a disc with a conical-spherical side surface and centrally located a cut-out whose surface has a conical or a spherical shape.

* * * * *